(12) United States Patent
Pomeroy et al.

(10) Patent No.: US 11,879,414 B2
(45) Date of Patent: Jan. 23, 2024

(54) HYBRID ROCKET OXIDIZER FLOW CONTROL SYSTEM INCLUDING REGRESSION RATE SENSORS

(71) Applicant: Sierra Space Corporation, Broomfield, CO (US)

(72) Inventors: Brian Richard Pomeroy, Broomfield, CO (US); Martin Chiaverini, Broomfield, CO (US); Jesse Morgan Warrick, Broomfield, CO (US)

(73) Assignee: Sierra Space Corporation, Broomfield, CO (US)

( * ) Notice: Subject to any disclaimer, the term of this patent is extended or adjusted under 35 U.S.C. 154(b) by 0 days.

(21) Appl. No.: 17/719,229

(22) Filed: Apr. 12, 2022

(65) Prior Publication Data
US 2023/0323840 A1    Oct. 12, 2023

(51) Int. Cl.
*F02K 9/72* (2006.01)
*F02K 9/10* (2006.01)
(Continued)

(52) U.S. Cl.
CPC .................. *F02K 9/72* (2013.01); *F02K 9/10* (2013.01); *F02K 9/26* (2013.01); *F02K 9/52* (2013.01); *F02K 9/56* (2013.01)

(58) Field of Classification Search
CPC ..... F02K 9/10; F02K 9/26; F02K 9/52; F02K 9/56; F02K 9/72
See application file for complete search history.

(56) References Cited

U.S. PATENT DOCUMENTS

| 3,059,429 A | 10/1962 | Bjerklie et al. |
| 3,091,520 A | 5/1963 | Newburn |

(Continued)

FOREIGN PATENT DOCUMENTS

| CN | 105020050 A | 11/2015 |
| CN | 110118136 A | 8/2019 |

(Continued)

OTHER PUBLICATIONS

Messineo et al., Theoretical Investigation on Feedback Control of Hybrid Rocket Engines, Institute of Space and Astronautical Science, Japan Aerospace Exploration Agency, Published Jun. 3, 2019, pp. 1-51, (Year: 2019).*

(Continued)

*Primary Examiner* — William H Rodriguez
(74) *Attorney, Agent, or Firm* — Mintz, Levin, Cohn, Ferris, Glovsky and Popeo, P.C.

(57) ABSTRACT

Various embodiments of a vortex hybrid motor system are described herein. In some embodiments, the vortex hybrid motor system can include a control system, a vortex hybrid motor, and an oxidizer injector. The oxidizer injector can be in fluid communication with a combustion zone defined by a fuel core and/or housing of the vortex hybrid motor. In some embodiments, at least one material regression sensor can be positioned along the fuel core and sensed data from the material regression sensors can be provided to the control system for determining one or more characteristics associated with the fuel core. The control system can control, based on the analyzed sensed data, the oxidizer injector for modulating an oxidizer flow rate delivered to the combustion zone to achieve a desired oxidizer-to-fuel ratio.

20 Claims, 6 Drawing Sheets

(51) Int. Cl.
*F02K 9/26* (2006.01)
*F02K 9/56* (2006.01)
*F02K 9/52* (2006.01)

(56) References Cited

U.S. PATENT DOCUMENTS

| | | | | |
|---|---|---|---|---|
| 3,115,007 | A | * | 12/1963 | Fox .......................... F02K 9/72 |
| | | | | 60/39.47 |
| 3,135,703 | A | | 6/1964 | MacDonald |
| 3,158,997 | A | | 12/1964 | Blackman et al. |
| 3,177,657 | A | | 4/1965 | Strauss et al. |
| 3,201,973 | A | * | 8/1965 | Fitzgerald ............ G01N 33/222 |
| | | | | 102/374 |
| 3,315,472 | A | | 4/1967 | Moutet |
| 3,368,353 | A | * | 2/1968 | Allport ..................... F02K 9/56 |
| | | | | 60/257 |
| 3,426,534 | A | | 2/1969 | Murphy |
| 3,560,407 | A | | 2/1971 | McCormick |
| 3,591,907 | A | | 7/1971 | MacMunn |
| 3,618,324 | A | | 11/1971 | Munding |
| 3,640,072 | A | | 2/1972 | Kayser |
| 3,648,461 | A | | 3/1972 | Bailey et al. |
| 3,695,041 | A | | 10/1972 | Eggers et al. |
| 3,712,059 | A | | 1/1973 | Drexhage |
| 3,715,888 | A | * | 2/1973 | Massie ..................... F02K 9/18 |
| | | | | 60/254 |
| 3,768,253 | A | | 10/1973 | Drawbaugh |
| 3,773,462 | A | | 11/1973 | Waeselynck |
| 3,871,828 | A | | 3/1975 | Ellion et al. |
| 3,899,815 | A | | 8/1975 | Maddox |
| 3,903,693 | A | | 9/1975 | Fox |
| 3,956,885 | A | | 5/1976 | Davis et al. |
| 4,069,664 | A | | 1/1978 | Ellion et al. |
| 4,322,946 | A | | 4/1982 | Murch et al. |
| 4,811,556 | A | | 3/1989 | Lau et al. |
| 4,817,890 | A | | 4/1989 | Coffinberry |
| 4,840,025 | A | | 6/1989 | Coffinberry |
| 4,841,723 | A | | 6/1989 | Lau et al. |
| 5,010,730 | A | * | 4/1991 | Knuth ....................... F02K 9/72 |
| | | | | 60/262 |
| 5,101,623 | A | | 4/1992 | Briley |
| 5,107,129 | A | * | 4/1992 | Lombrozo ................ F23N 5/08 |
| | | | | 250/227.28 |
| 5,319,926 | A | | 6/1994 | Steenborg |
| 5,367,872 | A | * | 11/1994 | Lund ....................... F02K 9/14 |
| | | | | 102/288 |
| 5,372,070 | A | | 12/1994 | Neidert et al. |
| 5,404,715 | A | | 4/1995 | Vuillamy et al. |
| 5,529,648 | A | * | 6/1996 | Stickler ................... C06D 5/00 |
| | | | | 149/19.5 |
| 5,582,001 | A | * | 12/1996 | Bradford .................. F02K 9/72 |
| | | | | 60/211 |
| 5,622,046 | A | | 4/1997 | Michaels et al. |
| 5,715,675 | A | | 2/1998 | Smith et al. |
| 5,794,435 | A | * | 8/1998 | Jones ....................... F02K 9/50 |
| | | | | 60/260 |
| 5,799,902 | A | | 9/1998 | Keith et al. |
| 5,819,526 | A | | 10/1998 | Jackson et al. |
| 6,014,857 | A | * | 1/2000 | Stinnesbeck .............. F02K 9/52 |
| | | | | 60/251 |
| 6,073,437 | A | * | 6/2000 | Jones ....................... G01B 11/24 |
| | | | | 60/251 |
| 6,101,808 | A | | 8/2000 | Knuth et al. |
| 6,135,393 | A | | 10/2000 | Sackheim et al. |
| 6,272,846 | B1 | | 8/2001 | Schneider |
| 6,298,659 | B1 | | 10/2001 | Knuth et al. |
| 6,311,477 | B1 | | 11/2001 | Schneider |
| 6,354,074 | B1 | * | 3/2002 | Jones ....................... F02K 9/76 |
| | | | | 60/251 |
| 6,590,403 | B1 | * | 7/2003 | Gramer .................... H01C 3/08 |
| | | | | 324/71.2 |
| 6,601,380 | B2 | | 8/2003 | Knuth et al. |
| 6,865,878 | B2 | | 3/2005 | Knuth et al. |
| 7,257,939 | B2 | | 8/2007 | Michaels et al. |
| 7,770,380 | B2 | | 8/2010 | Dulligan et al. |
| 9,038,368 | B2 | | 5/2015 | Fuller |
| 9,458,796 | B2 | | 10/2016 | Chen et al. |
| 2001/0022954 | A1 | | 9/2001 | Sakashita et al. |
| 2002/0036038 | A1 | * | 3/2002 | Karabeyoglu .......... C06B 47/02 |
| | | | | 149/19.9 |
| 2002/0069636 | A1 | | 6/2002 | Knuth et al. |
| 2004/0068976 | A1 | | 4/2004 | Knuth et al. |
| 2004/0197247 | A1 | | 10/2004 | Lohner et al. |
| 2007/0074501 | A1 | | 4/2007 | Oren |
| 2007/0144140 | A1 | * | 6/2007 | Sarigul-Klijn ............ F02K 9/72 |
| | | | | 60/200.1 |
| 2008/0056961 | A1 | | 3/2008 | Matveev |
| 2008/0256924 | A1 | | 10/2008 | Pederson et al. |
| 2009/0031700 | A1 | | 2/2009 | Karabeyoglu |
| 2009/0217525 | A1 | * | 9/2009 | Fuller ..................... B33Y 80/00 |
| | | | | 60/251 |
| 2009/0217642 | A1 | * | 9/2009 | Fuller ..................... F02K 9/10 |
| | | | | 60/251 |
| 2012/0060464 | A1 | | 3/2012 | Grote et al. |
| 2013/0031888 | A1 | * | 2/2013 | Fuller ..................... F02K 9/12 |
| | | | | 29/890.01 |
| 2013/0042596 | A1 | | 2/2013 | Fuller |
| 2013/0074472 | A1 | | 3/2013 | Jensen |
| 2014/0026537 | A1 | | 1/2014 | Eilers et al. |
| 2014/0123654 | A1 | | 5/2014 | Kemmerer et al. |
| 2014/0260305 | A1 | | 9/2014 | Hobbs et al. |
| 2014/0352276 | A1 | | 12/2014 | Chen et al. |
| 2017/0122259 | A1 | * | 5/2017 | Kliger ..................... F02K 9/26 |
| 2018/0118634 | A1 | * | 5/2018 | Sherman .................. C06D 5/10 |
| 2018/0156159 | A1 | | 6/2018 | Adriany |
| 2018/0334996 | A1 | * | 11/2018 | Chew ....................... F02K 9/28 |
| 2020/0063692 | A1 | | 2/2020 | Wallace |
| 2020/0116106 | A1 | | 4/2020 | Chiaverini et al. |
| 2020/0240365 | A1 | | 7/2020 | Elzein et al. |
| 2020/0400103 | A1 | | 12/2020 | Cavitt et al. |
| 2022/0120240 | A1 | | 4/2022 | Cavitt et al. |
| 2023/0059681 | A1 | | 2/2023 | Pomeroy et al. |

FOREIGN PATENT DOCUMENTS

| | | |
|---|---|---|
| DE | 19650411 A1 | 6/1997 |
| EP | 3677766 A1 | 7/2020 |
| JP | H07 310594 A | 11/1995 |
| WO | WO-2020/076975 A1 | 4/2020 |

OTHER PUBLICATIONS

Messineo et al., Introduction to Resistor-Based sensors for Feedback Control of Hybrid Rocket Engines, Publication Jun. 2018, pp. 1-4 (Year: 2018).*

Thomas et al., Enhancement of Regression Rates in Hybrid Rockets with HTPB Fuel Grains by Metallic Additives, AIAA Propulsion and Energy Forum, Jul. 27-29, 2015, pp. 1-16 (Year: 2015).*

Richard, Solid Rocket Motor Theory: Propellant Grain, Jul. 5, 2001, 6 pages (Year: 2001).*

Bath, Andrew, Performance Characterization of Complex Fuel Port Geometries for Hybrid Rocket Fuel Grains, Dec. 2012, Utah State University, pp. 13-14. (Year: 2012).

Brinkley, A. et al. (2015). Development and test of a 90% H2O2/Kerosene decent thruster for the rocket City Space Pioneer's Google X Prize Lunar Lander. Dynetics Inc., 25 pages.

Cervone, A. et al. (2015). "Development of Hydrogen Peroxide Monopropellant Rockets," AIAA. 11 pages.

Chemical and Material Sciences Department, Research Division. Hydrogen Peroxide Handbook, Technical Report AFRPL-TR-67-144. Rocketdyne, a Division of North American Aviation, Inc., 1967. 488 pages.

Fletcher-Wood, R. (2016). "Hydrazine," 2016, RSC Education. 3 pages.

Jonker, W.A., et al. (2011). Development of a Rocket Engine Igniter Using the Catalytic Decomposition of Hydrogen Peroxide. TNO Science and Industry, 6 pages.

Krishnan, S., Ahn, S., & Lee, C. (2010). Design and Development of a Hydrogen-Peroxide Rocket Engine Facility. 10 pages. oai:generic. eprints.org:7057/core392.

(56) References Cited

OTHER PUBLICATIONS

Lee, S-L. et al. (Jan. 2009, e-published Apr. 24, 2008). "Performance characteristics of silver catalyst bed for hydrogen peroxide." Aerospace Science and Technology, 13, 12-17.

Love, J. E., & Stillwell, W. H. (1959). The hydrogen-peroxide rocket reaction-control system for the X-1B research airplane. Tech Note D-185. Washington, DC: National Aeronautics and Space Administration. 30 pages.

Maia, F.F. et al. (2014). "Development and Optimization of a Catalytic Thruster for Hydrogen Peroxide Decomposition." Journal of Aerospace Technology and Management, 6, 61-67.

McCormick, J.C. (1965). Hydrogen Peroxide Rocket Manual. FMC Corporation. Propulsion Department, 220 pages.

Othman, N. et al. (2011). "Design and Testing of a 50N Hydrogen Peroxide Monopropellant Rocket Thruster." Jurnal Mekanikal. 33(2):70-81.

Palmer, M. J. (2014). Experimental evaluation of hydrogen peroxide catalysts for monopropellant attitude control thrusters. University of Southampton, Faculty of Engineering and the Environment, Aerodynamics and Flight Mechanics Group, PhD Thesis. 271 pages. https://eprints.soton.ac.uk/385352/.

Palmer, M., Musker, A., & Roberts, G. (2011). Experimental Assessment of Heterogeneous Catalysts for the Decomposition of Hydrogen Peroxide. 47th AIAA/ASME/SAE/ASEE Joint Propulsion Conference & Exhibit. 9 pages. doi:10.2514/6.2011-5695.

Palmer, M., Roberts, G., & Musker, A. (2011). Design, Build and Test of a 20 N Hydrogen Peroxide Monopropellant Thruster. 47th AIAA/ASME/SAE/ASEE Joint Propulsion Conference & Exhibit. 17 pages. doi:10.2514/6.2011-5697.

Ryan, H.M. et al. (Jan.-Feb. 1995). "Atomization characteristics of impinging liquid jets." Journal of Propulsion and Power, 11:1, 135-145.

Ventura, M., Wernimont, E., Heister, S., & Yuan, S. (2007). Rocket Grade Hydrogen Peroxide (RGHP) for use in Propulsion and Power Devices—Historical Discussion of Hazards. 43rd AIAA/ASME/SAE/ASEE Joint Propulsion Conference & Exhibit. 22 pages. doi:10.2514/6.2007-5468.

Wernimont, E., & Durant, D. (2004). State of the Art High Performance Hydrogen Peroxide Catalyst Beds. 40th AIAA/ASME/SAE/ASEE Joint Propulsion Conference and Exhibit. 7 pages. doi:10.2514/6.2004-4147.

Wernimont, E.J. et al. (1999). "Past and Present Uses of Rocket Grade Hydrogen Peroxide." 2nd International Hydrogen Peroxide Propulsion Conference, 15 pages.

Wieling, W., Zandbergen, B.T.C., Mayer, A, & Schrijer, F. (2012). "Development of a Hydrogen Peroxide/Ethanol Thruster for the Advanced Re-entry Vehicle." Space Propulsion 2012. 11 pages.

Willis, C.M. (1960). The Effect of Catalyst-Bed Arrangement on Thrust Buildup and Decay Time for a 90 Percent Hydrogen Peroxide Control Rocket. Tech Note D-516, National Aeronautics and Space Administration, 39 pages.

Zandbergen "Some Typical Solid Propellant Rocket Motors," Dec. 2013, Delft University of Technology, pp. 4-6. (Year: 2013).

"Mesh and Micron Sizes" ISM Industrial Specialties Mfg. & IS MED Specialties, Mar. 11, 2020, pp. 1-7 (Year: 2020).

Haq, N. Ui, et al. (2017). "Design, Development and Testing of 1N Hydrogen Peroxide Thruster." 2017 14th International Bhurban Conference on Applied Sciences and Technology (IBCAST). IEEE, 2017. pp. 599-607.

Neumaier, W.W. et al. (2012). "Development of a 90% Hydrogen Peroxide Mono-Propellant Propulsion System for the Warm Gas Test Article." 48th AIAA/ASME/SAE/ASEE Joint Propulsion Conference & Exhibit. 2012. pp. 1-11.

Lancelle, D. and O. Božić. (2015). "Thermal Protection, Aerodynamics, and Control Simulation of an Electromagnetically Launched Projectile." in IEEE Transactions on Plasma Science ,IEEE Service Center, Piscataway, NJ, US, vol. 43, No. 5, pp. 1156-1161, May 1, 2015, doi: 10.1109/TPS.2015.2415040. [retrieved on May 6, 2015].

Li, H. et al. (2017, e-published Sep. 11, 2017). "The design and main performance of a hydrogen peroxide/kerosene coaxial-swirl injector in a lab-scale rocket engine." Aerospace Science and Technology, vol. 70, pp. 636-643, ISSN 1270-9638, https://doi.org/10.1016/j.ast.2017.09.03.

* cited by examiner

HYBRID ROCKET OXIDIZER FLOW CONTROL SYSTEM INCLUDING REGRESSION RATE SENSORS

TECHNICAL FIELD

The subject matter described herein relates to a vortex hybrid motor system.

BACKGROUND

Hybrid rockets can provide safer, lower-cost options compared to conventional solid propellant and liquid bi-propellant rocket propulsion systems. However, despite these benefits, classical hybrid rocket engines can suffer from relatively slow solid fuel regression rates, low volumetric loading, and relatively poor combustion efficiency. Vortex hybrid rockets can use swirl injector technology to add oxidizer to burning fuel to assist with mixing the oxidizer and fuel. However, at least some currently available swirl injector technology cannot achieve desired oxidizer-to-fuel ratios and complete mixing of oxidizer and fuel.

SUMMARY

Aspects of the current subject matter include various embodiments of a vortex hybrid motor system. In one aspect, the vortex hybrid motor system can include a material regression sensor positioned along a fuel core of a vortex hybrid motor of the vortex hybrid motor system. The material regression sensor can be configured to sense data associated with the fuel core. The vortex hybrid motor system can also include at least one processor communicatively coupled to the material regression sensor, as well as at least one memory storing instructions thereon that, when executed by the at least one processor, can result in operations including: receiving, using the at least one processor, the sensed data from the material regression sensor; determining, using the at least one processor and based on the sensed data, at least one characteristic of the fuel core; and controlling, based on the determined at least one characteristic of the fuel core, a flow rate of an oxidizer to a combustion zone within the vortex hybrid motor.

In some variations one or more of the following features can optionally be included in any feasible combination. At least one characteristic of the fuel core can include one or more of a burn rate of the fuel core and a surface area of a surface of the fuel core. The material regression sensor can extend approximately perpendicular to the surface of the fuel core. The surface can define at least a part of the combustion zone. The material regression sensor can include a plurality of rungs that are electrically conductive and spaced apart along a conductive feature. The determining can be based on one or more of a distance between a pair of rungs of the plurality of rungs and a duration between a change in resistance detected from the sensed data.

In some embodiments, the fuel core can include one or more of a rubber, plastic, wax, metal powder, carbon, and manufactured fuel. The oxidizer can include one or more of a liquid oxygen, hydrogen peroxide, nitrous oxide, and nitric acid. The controlling of the flow rate can include providing instructions to an oxidizer injector to increase or decrease the flow rate of oxidizer dispensed from the oxidizer injector, and the oxidizer injector can be in fluid communication with the combustion zone.

In another interrelated aspect of the current subject matter, a method includes receiving, using at least one processor of an embodiment of a vortex hybrid motor system, sensed data from a material regression sensor positioned along a fuel core of a vortex hybrid motor of the vortex hybrid motor system. The method can also include determining, using the at least one processor and based on the sensed data, at least one characteristic of the fuel core. The method can further include controlling, based on the determined at least one characteristic, a flow rate of an oxidizer to a combustion zone within the vortex hybrid motor.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Various embodiments of a vortex hybrid motor system are described herein that can be included in various propulsion systems and rockets, such as vortex hybrid rockets. In some embodiments, the vortex hybrid motor system is configured to actively control an oxidizer flow rate to a combustion chamber containing a solid fuel in order to achieve desired oxidizer-to-fuel ratios. Such control of the oxidizer flow rate can depend on a fuel type of the solid fuel, as well as a burn rate of the solid fuel and/or a surface area of a surface of the solid fuel determined by the vortex hybrid motor system. This can allow the vortex hybrid motor system to achieve greater performance for longer periods of time, such as compared to at least some currently available vortex rocket motors.

The vortex hybrid motor system of the present disclosure includes various embodiments of a vortex hybrid motor, a control system, and at least one oxidizer injector. As will be described in greater detail below, the vortex hybrid motor can include at least one material regression sensor associated with a solid fuel core in the combustion chamber or housing of the vortex hybrid motor. The material regression sensors can be configured to provide data to the control system for determining various characteristics of the fuel core. For example, each material regression sensor can provide data associated with a dimension (e.g., thickness) of the solid fuel core. In some embodiments, as the fuel core reacts with oxidizer, the fuel core regresses and changes shape over time (e.g., inner diameter of fuel core becomes larger and thickness of fuel core becomes smaller). As such, material regression sensors can be positioned within the fuel core to detect such regression and changes in shape of the fuel core over time (e.g., burn rate of the fuel core). Data associated with such detection can be provided to the control system, which can use such data to determine the burn rate of the fuel core and/or a surface area of at least one surface of the fuel core. The control system can then adjust the oxidizer flow rate, as needed, based on the determined burn rate and/or fuel surface area in order to achieve desired oxidizer-to-fuel ratios. The vortex hybrid motor system can thus include a closed feedback loop to determine and achieve a desired oxidizer flow rate based on a current fuel burn rate and fuel surface area, which can ensure complete mixing of the oxidizer and fuel, as well as maximize total and specific impulses of the vortex hybrid motor system. Furthermore, although a vortex hybrid motor is described herein as an example motor for use with the material regression sensors and control systems, any motor system having a solid core that changes size and/or shape over time (e.g., undergoes a burn rate) can be used with the material regression sensors and control systems described herein without departing from the scope of this disclosure.

In some embodiments, the fuel core may include a variety of shapes, sizes and materials, including rubbers, plastics, waxes, metal powders (such as aluminum, magnesium, aluminum hydride, and boron), carbon, and additively manufactured versions of fuels. A plurality of fuel core embodiments can be used in conjunction with the material regression sensors and are not limited to the fuel core embodiments described herein.

In some embodiments, the oxidizer can include liquid oxygen, hydrogen peroxide, nitrous oxide, and/or nitric acid. Other liquid oxidizers are within the scope of this disclosure. Upon delivery of the oxidizer into the housing (e.g., into a combustion zone) of the vortex hybrid motor (e.g., via an oxidizer injector), the oxidizer can contact and mix with fuel along the surface of the fuel core (e.g., along one or more surfaces of the fuel core defining at least a part of the combustion zone) to create a desired thrust and propel the propulsion system.

Furthermore, in some embodiments the oxidizer can be in solid form (e.g., solid oxidizer core) and positioned in the vortex hybrid motor and a flow rate of liquid fuel can be delivered to the vortex hybrid motor to create the desired thrust and propel the propulsion system. As such, one or more material regression sensors can be positioned in the solid oxidizer core for controlling a flow rate of liquid fuel without departing from the scope of this disclosure.

In some embodiments, a combustion zone within the vortex hybrid motor is defined by the fuel core and/or the housing of the vortex hybrid motor. The oxidizer can be delivered to the combustion zone for reacting with the fuel core. The combustion zone may also include more than one zones, such as an upper zone and a central zone, that each contribute to the created thrust. Although specific examples regarding shape and configuration of combustion zones formed by the fuel core and/or housing are disclosed herein, any number of shapes and configurations of the combustion zone are within the scope of this disclosure.

In some embodiments, at least one oxidizer injector may deliver oxidizer into the combustion zone via an injection port. Additionally, the oxidizer can be delivered in a direction tangential to a circumference of an inner cylindrical surface of a sidewall of the vortex hybrid motor housing. This tangential injection can cause a flow of oxidizer in the combustion zone to swirl. The flow may inherently translate inwardly to the center of the vortex hybrid motor where the flow moves spirally away from a closed proximal end of the housing, down the core of the combustion zone and out a nozzle. Such flow may be created by injecting the oxidizer into a generally cylindrical combustion zone (e.g., defined by a cylindrical surface of the fuel core) that is closed at a proximal end and in communication with a nozzle at a distal end of the housing. Any number of oxidizer injectors and injection ports can be included in the vortex hybrid motor system without departing from the scope of this disclosure.

Various embodiments of the vortex hybrid motor system are described in detail below, including various embodiments of a vortex hybrid motor including one or more material regression sensors in communication with a control system for controlling an oxidizer flow rate from at least one oxidizer injector.

Figure 1:
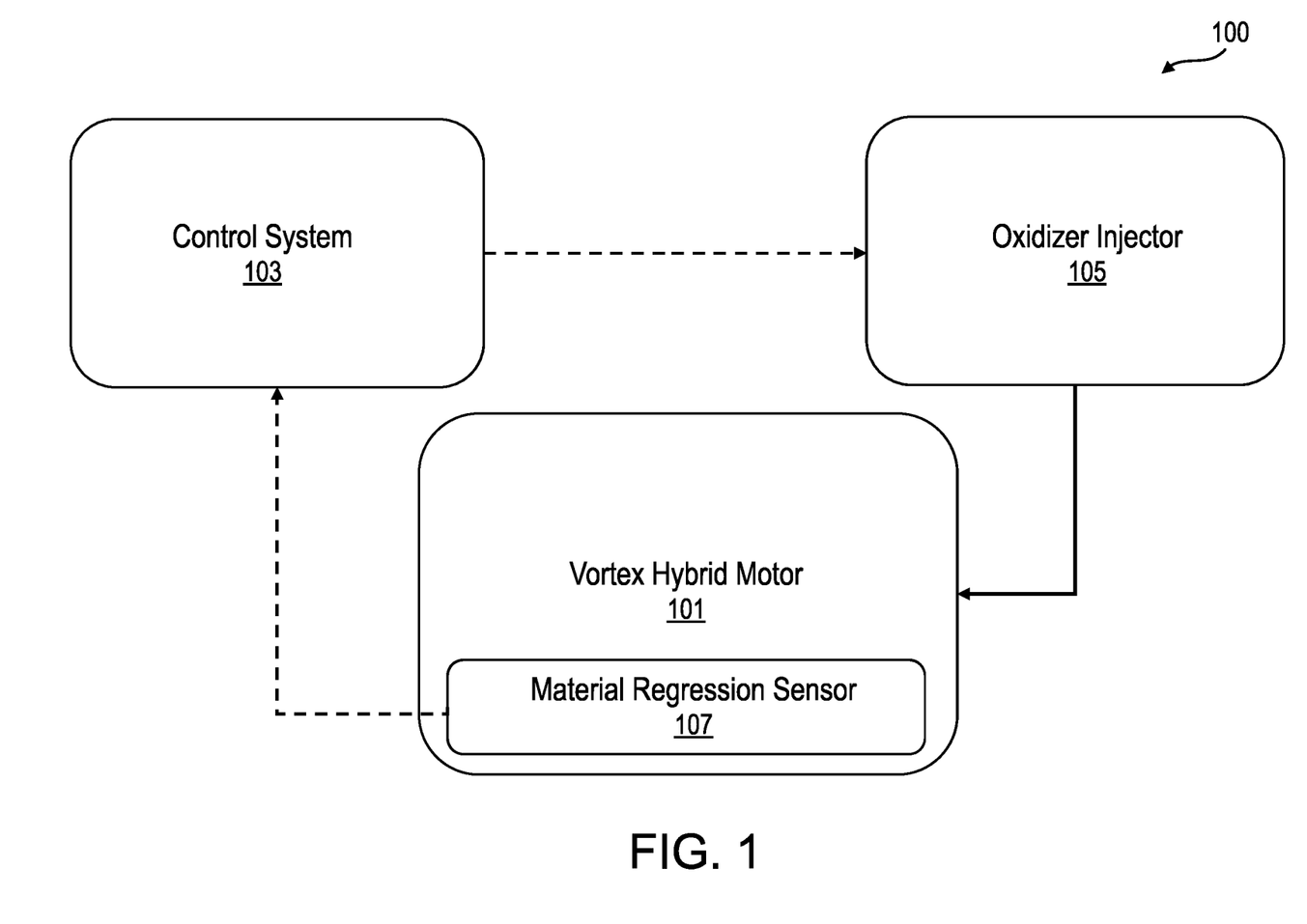
FIG. 1 is a diagram of an embodiment of a vortex hybrid motor system including a vortex hybrid motor, a control system, and an oxidizer injector consistent with implementations of the current subject matter.

FIG. 1 illustrates a diagram of an embodiment of a vortex hybrid motor system 100 including an embodiment of a vortex hybrid motor 101, a control system 103, and an oxidizer injector 105. As shown in FIG. 1, the vortex hybrid motor 101 can include a material regression sensor 107 that is in communication with and provides data to the control system 103. The control system 103 can analyze such data to determine a desired oxidizer flow rate to achieve an oxidizer-to-fuel ratio that results in effective mixing of oxidizer and fuel to maximize total and specific impulses of the vortex hybrid motor 101.

The control system 103 can also be in communication with an oxidizer injector 105, as shown in FIG. 1. As such, the control system 103 can control, based on the analyzed data, the oxidizer injector 105 to deliver the desired oxidizer flow rate into the vortex hybrid motor 102. The vortex hybrid motor system 100 can thus include a closed feedback loop including a control system 103, which includes one or more processors, that continuously determines and controls an oxidizer flow rate based on sensed data from the material regression sensor 107. Although FIG. 1 illustrates the control system 103 being in communication with one material regression sensor 107 and one oxidizer injector 105, the control system 103 can be in communication with more than one material regression sensor 107 and more than one oxidizer injector 105 without departing from the scope of this disclosure.

Figure 2:
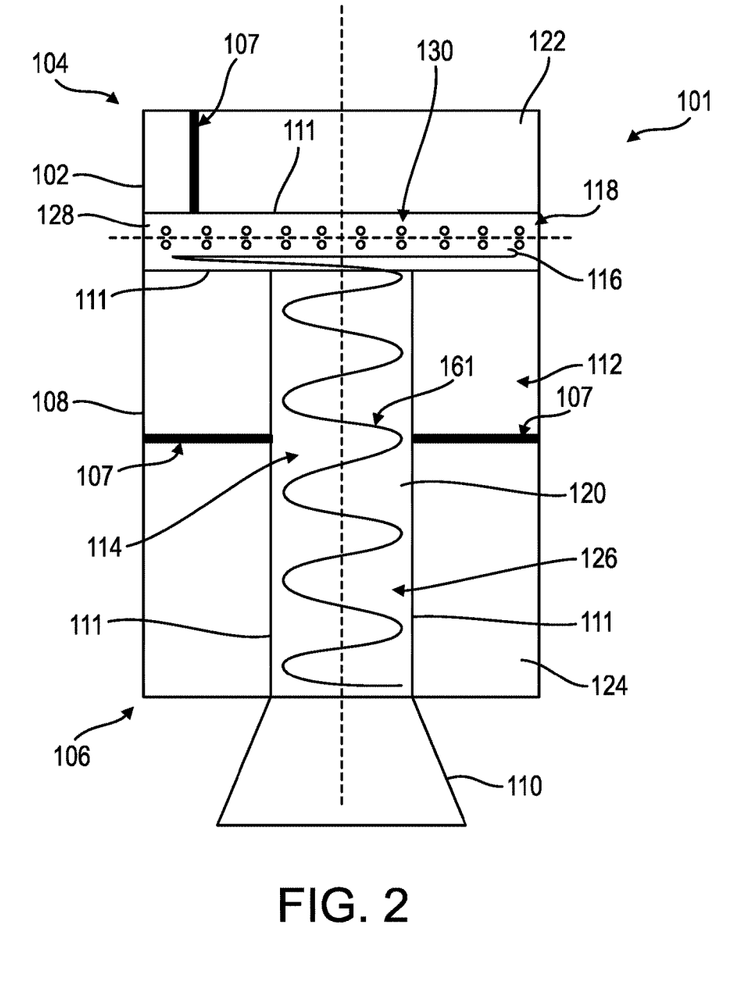
FIG. 2 illustrates a side sectional view of an embodiment of the vortex hybrid motor of FIG. 1 showing material regression sensors embedded in a fuel core.

FIG. 2 illustrates an embodiment of the vortex hybrid motor 101 including a housing 102 having a proximal end 104, a distal end 106, and a sidewall 108 extending between the proximal end 104 and distal end 106. The housing 102 may be cylindrical in shape, however, other shapes are within the scope of this disclosure. The distal end 106 may include a nozzle 110 that provides a passageway through the distal end 106 of the housing 102.

As shown in FIG. 2, the vortex hybrid motor 101 can include a fuel core 112 that fills a part of the housing 102 and defines a part of a combustion zone 114. The combustion zone 114 includes a space within the vortex hybrid motor 101 where oxidizer 116 may be introduced for reacting with the fuel core 112 (e.g., along at least one surface 111 of the fuel core 112), thereby creating thrust. The combustion zone 114 can include one or more of a variety of shapes and sizes for achieving a variety of thrust profiles. Furthermore, the combustion zone 114 can change size and/or shape as a result of burning of fuel and regression of the fuel core 112. For example, burning of the fuel core 112 along the surface 111 defining at least part of the combustion zone 114 can cause regression of the fuel core 112 radially outward and thus increase the diameter of the combustion zone 114, as well as increase the area of the surface 111 of the fuel core 112 defining at least a part of the combustion zone 114. As the area of the surface 111 of the fuel core 112 increases (e.g., as a result of regression of the fuel core 112), the fuel burn rate can decrease and require a lower oxidizer flow rate. For example, an amount of oxidizer needed for mixing with fuel of the fuel core 112 can be inversely proportional to the size of the surface area of the fuel core 112. As will be explained in greater detail below, the material regression sensors 107 can provide sensed data to the control system 103 for controlling oxidizer flow rate based on determined characteristics of the fuel core 112.

Any number of material regression sensors 107 can be included in the vortex hybrid motor 101 in order to collect sensed data that can be provided to the control system 103 for determining one or more characteristics associated with the fuel core 112, such as burn rate of the fuel core 112 and surface area of the fuel core 112 (e.g., surface 111 of fuel core 112 defining combustion zone 114). As shown in FIG. 2, the fuel core 112 can include more than one surface 111 forming at least a part of the combustion zone 114.

For example, in some embodiments the combustion zone 114 may include an upper zone 118 positioned proximal to a central zone 120, with the upper zone 118 and central zone 120 including different characteristics for contributing various affects to the creation and strength of thrust. Such a configuration may provide at least three surfaces 111 for allowing the oxidizer 116 to react with the fuel core 112.

In some embodiments, at least one surface 111 of the fuel core 112 is in contact with a respective material regression sensor 107. This can allow each material regression sensor 107 to provide sensed data to the control system 103 for determining a burn rate and a surface area forming the combustion zone 114 of the fuel core 112. For example, the surface area can be determined based on initial dimensions of the fuel core and/or determined burn rates of the fuel core 112 over time. In some embodiments, the initial dimensions of the fuel core 112 can include a wall thickness and length of the fuel core 112. A type of fuel included in the fuel core 112 can also assist in determining fuel burn rate and/or surface area of the fuel core 112. In some embodiments, the actual burn rate of the fuel core 112 (e.g., determined based on the sensed data from the material regression sensors 107) and an expected burn rate (e.g., based on the initial dimensions and/or fuel type) can be compared.

As shown in FIG. 2, at least one material regression sensor 107 (e.g., two or more material regression sensors 107) can be positioned relative to the fuel core 112 for assisting with determining and monitoring one or more characteristics associated with the fuel core 112. As discussed above, the material regression sensors 107 are in communication with the control system 103 such that the control system 103 can receive sensed data from the material regression sensors 107 in order to determine and monitor the one or more characteristics associated with the fuel core 112. For example, the control system 103 can include at least one processor for receiving and analyzing sensed data from the material regression sensors 107. The control system 103 can be configured to send instructions, based on the received sensed data, to the oxidizer injector for causing the oxidizer injector to increase or decrease an oxidizer flow rate being delivered to a combustion zone of a vortex hybrid motor 101.

For example, the material regression sensor 107 can be positioned (e.g., embedded) within the fuel core 112 such that regression of the fuel core 112 is sensed by the material regression sensor 107. Regression of the fuel core 112 can be defined as a dimensional loss of fuel core material from a surface 111 (e.g., exposed surface of the fuel core 112 defining at least a part of the combustion zone 114) of the fuel core 112. Any number of a variety of material regression sensor 107 can be included in the fuel core 112. For example, any one of the embodiments of the material regression sensor described in U.S. Pat. No. 6,590,403 can be included in any of the vortex hybrid motor 101 or vortex hybrid motor system 100 embodiments described herein. As such, the entire disclosure of U.S. Pat. No. 6,590,403, except for any definitions, disclaimers, disavowals, and inconsistencies, is incorporated herein by reference.

Figure 3A:
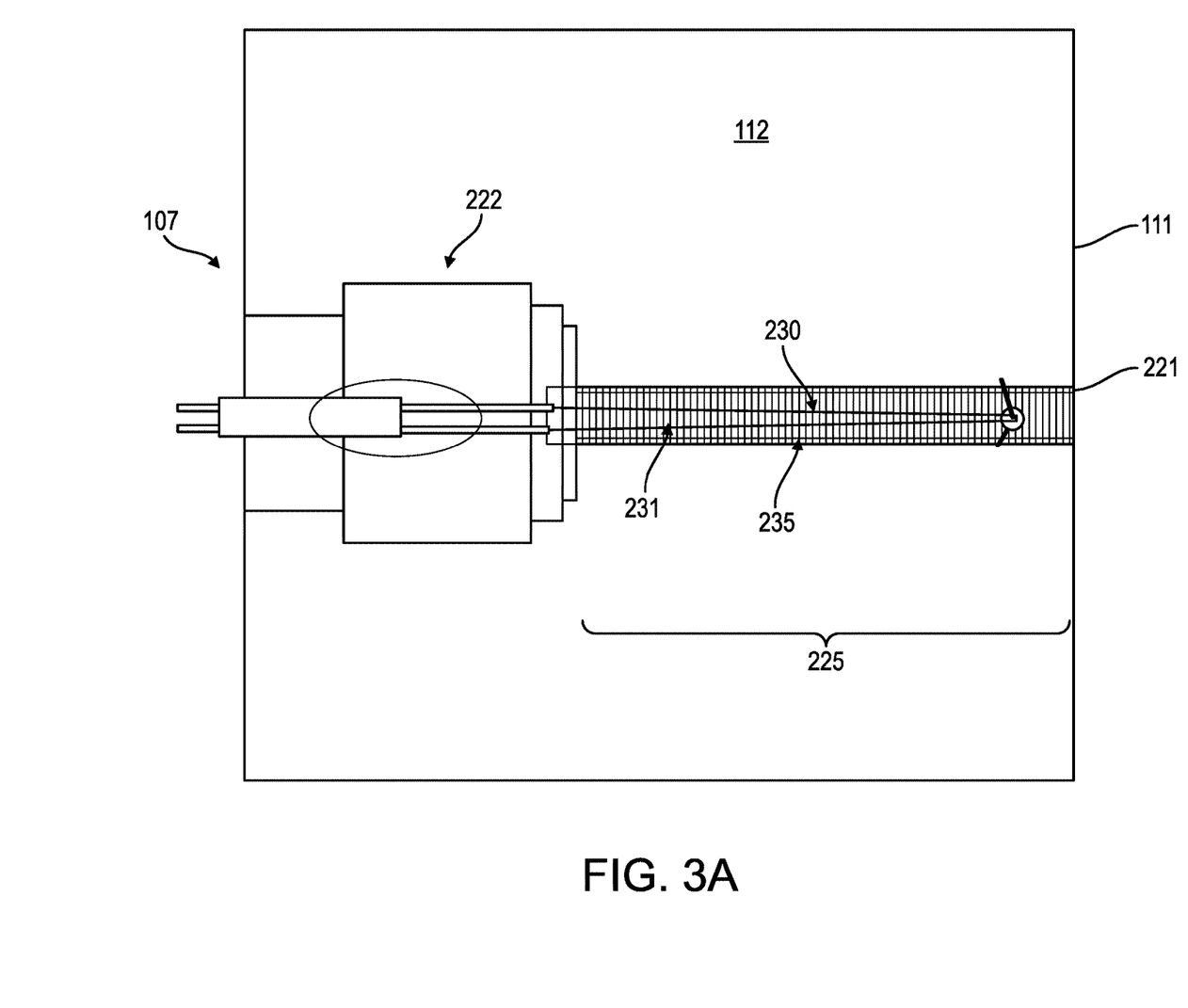
FIG. 3A illustrates a side view of an embodiment of at least one of the material regression sensors of FIG. 2 showing a distal end of the sensor positioned adjacent a surface of the fuel core.
Figure 3B:
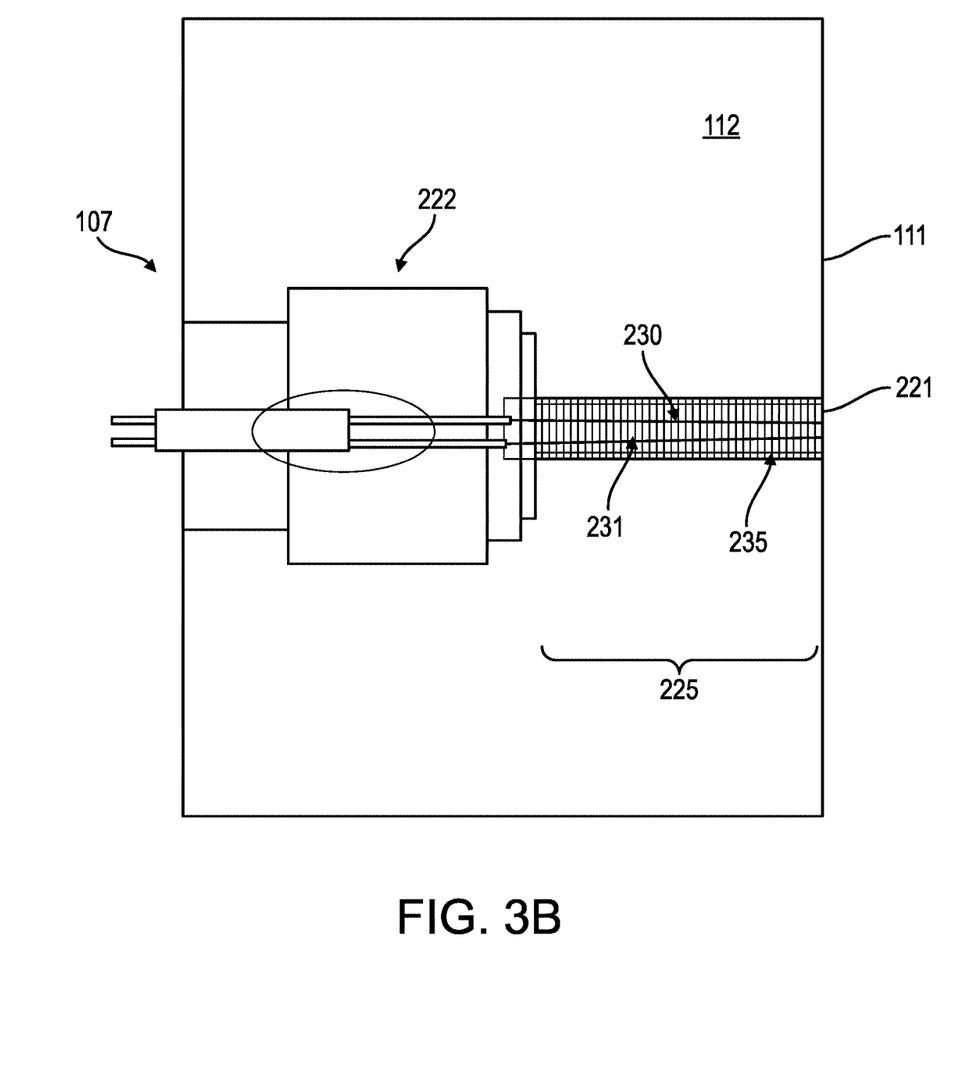
FIG. 3B illustrates a side view of an embodiment of the material regression sensor of FIG. 3A showing surface regression of the fuel core and a shortening of the material regression sensor as a result of the surface regression.

FIGS. 3A and 3B illustrate an example of an embodiment of a material regression sensor 107 positioned in a fuel core 112 at an initial state (e.g., prior to burning and regression of the fuel core 112) and after some regression of the fuel core 112, respectively. As shown in FIGS. 3A and 3B, the material regression sensor 107 can include a conductive feature (e.g., a pair of conductive wires or legs 230 and 231) extending from a proximal end 222 of the material regression sensor 107. The proximal end 222 can be in electrical communication with the control system 103. As shown in FIGS. 3A and 3B, a plurality of electrically conductive rungs 235 (e.g., high resistivity strips or conductive element portions) can be positioned between and/or in electrical contact with the conductive legs 230 and 231. For example, a sensor pattern of the material regression sensor 107 can be equivalent to several resistors in parallel. As shown, the plurality of rungs 235 can be spaced along a longitudinal axis or length of the material regression sensor 107. The width and spacing of the individual rungs 235 can vary. A current can be provided along the pair of conductive legs 230 and 231 and a resistance can be measured. As the surface 111 of the fuel core 112 regresses and burns, any exposed rungs 235 will become burned off thereby shortening the material regression sensor 107, as shown in FIG. 3B, and affecting the measured resistance.

As shown in FIGS. 3A and 3B, in some embodiments the material regression sensor 107 can be positioned perpendicular to a surface 111 (e.g., a regressing surface 111) and a distal end 221 of the material regression sensor 107 can be flush with the regressing surface 111. As such, as the surface 111 regresses, the distal end 221 of the material regression sensor 107 similarly regresses (as shown in FIG. 3B), thereby shortening a length of the material regression sensor 107. Such shortening and regression of the material regression sensor 107 can cause one or more step changes in the resistance measured from the conductive legs 230 and 231. For example, the regressing surface 111 can cause at least one rung 235 of the material regression sensor 107 to burn or wear away, thereby affecting a measured resistance along the material regression sensor 107. Such changes in resistance can be detected and measured through the use of signal conditioning. Additionally, the resistance measurements can be correlated to a thickness of the fuel core 112 and surface regression as a result of a defined relationship between the resistance of the material regression sensor 107 and a length 225 along which one or more rungs 235 are positioned along the pair of conductive legs 230 and 231.

Figure 4A:
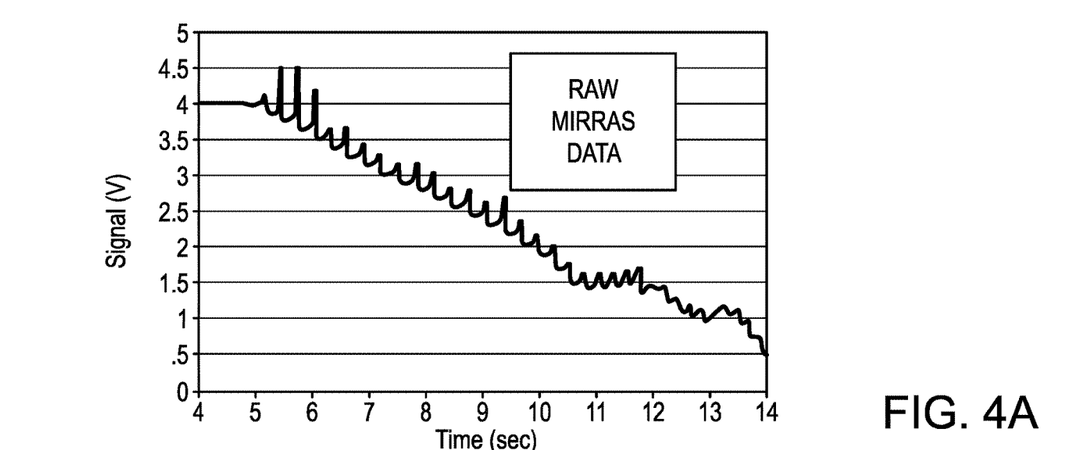
FIG. 4A illustrates a first graph showing example sensed data from the material regression sensor positioned along the fuel core.
Figure 4B:
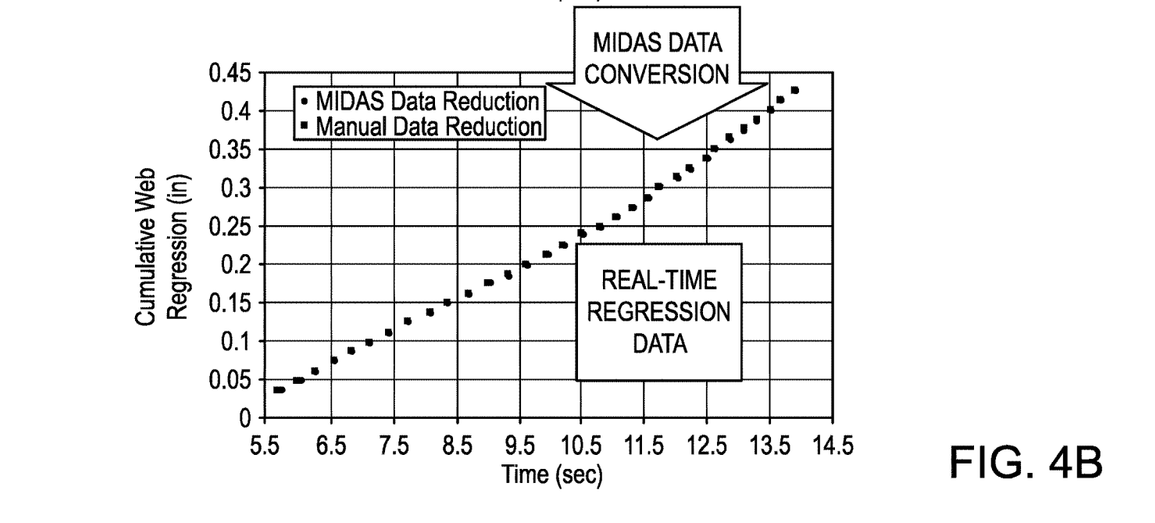
FIG. 4B illustrates a second graph showing example real-time regression data associated with the fuel core, which is determined based on the sensed data from the first graph.

FIGS. 4A and 4B illustrate data collected by the material regression sensor 107 and how such data can be used to determine fuel core 112 characteristics. For example, as shown in a first graph in FIG. 4A, discrete changes in resistance, as collected or sensed by the material regression sensor 107, can be detected by the control system 103 and occur as each rung 235 of the material regression sensor 107 is burned or worn away (e.g., as the fuel core 112 regresses and the surface area defining a part of the combustion zone 114 increases). The control system 103 can compare a duration between each of these discrete changes or jumps in resistance and a spacing of the rungs 235 (e.g., a distance between each pair of rungs 235), the burn rate of the fuel core 112 can be determined (e.g., from graph illustrated in FIG. 4B). Additionally, applying a curve fit to the data and then integrating the curve fit with respect to time can provide an accurate estimation of the instantaneous surface regression rate for periods where the surface regression is between two rungs 235. For example, resolution can be improved by decreasing the spacing between the rungs 235.

As shown in FIG. 2, the fuel core 112 may include a proximal part 122 and a distal part 124. The distal part 124 may have a cylindrical shape including an outer cylindrical surface that mates with an inner cylindrical surface of the sidewall 108 of the housing 102. The distal part 124 of the fuel core 112 may also include a cylindrical chamber 126 that defines the central zone 120 of the combustion zone 114. The cylindrical chamber 126 may extend along a longitudinal axis of the distal part 124 of the fuel core 112. As such, the central zone 120 of the combustion zone 114 may extend along the longitudinal axis of the distal part 124 of the fuel core 112.

As mentioned above, such a configuration of the fuel core 112 may provide at least three surface areas for allowing the oxidizer 116 to mix with the fuel core 112. Over time, the upper zone 118 may become wider as the surrounding fuel core 112 burns in a proximal and distal direction, and the central zone 120 may have a larger diameter as the fuel core 112 burns radially from the inside of the fuel core 112 towards the outer perimeter of the fuel core 112. Such changes can be detected and measured using at least one material regression sensor 107 in communication with the control system 103, as described herein.

For example, as the central zone 120 of the combustion zone 114 reacts over time with oxidizer 116 injected into the vortex hybrid motor 101, the radius of the central zone 120 (or cylindrical chamber 126) increases, thereby increasing the surface area of the fuel core 112 that the oxidizer may react with. As such, the oxidizer-to-fuel ratio may change over time as the oxidizer 116 is added to the combustion zone 114.

For example, the proximal part 122 of the fuel core 112 can include at least one sensor 107 for detecting a regression of the surface area defining the upper zone 118, as shown in FIG. 2. Additionally, the distal part 124 of the fuel core 112 can include at least one sensor 107 for detecting regression of the surface area defining the central zone 120. Sensed data received by the control system from the one or more sensors 107 positioned along one or more surfaces 111 and parts of the fuel core 112 can be used to determine fuel burn rate (e.g., along more than one surface 111) and surface area for determining a desired oxidizer flow rate. The desired oxidizer flow rate can provide sufficient oxidizer for mixing with current surface area and achieving a desired burn rate of the fuel core 112. As such, the control system 103 can efficiently and effectively adjust the oxidizer-to-fuel ratio to achieve maximum total and specific impulse.

Figure 5:
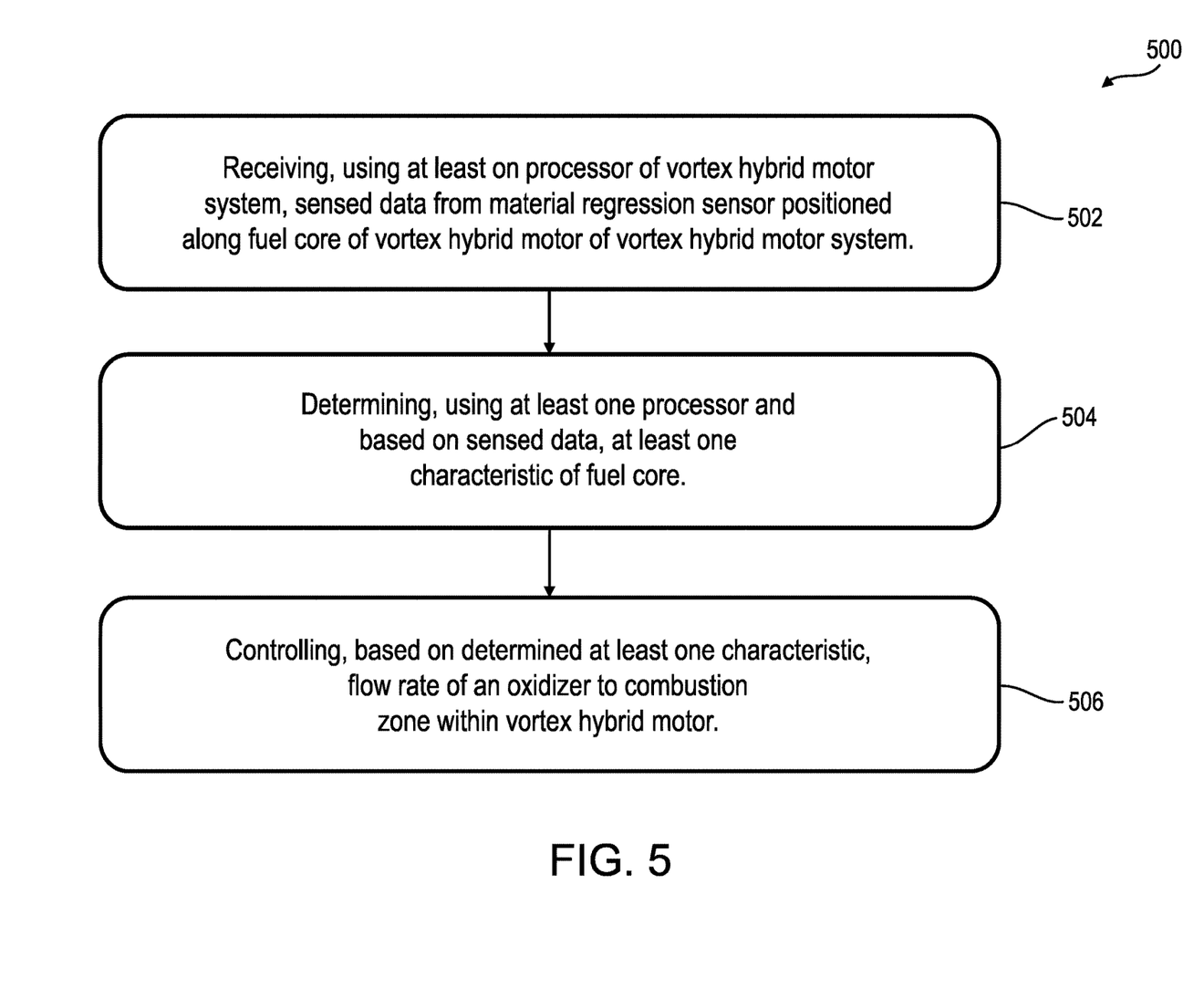
FIG. 5 is a flowchart of a process for enhanced oxidizer flow control to a vortex hybrid motor.

FIG. 5 shows a process flow chart 500 illustrating features of a method consistent with one or more implementations of the current subject matter. It will be understood that other implementations may include or exclude certain features. At 502, vortex hybrid motor system can receive, using at least one processor of the vortex hybrid motor system, sensed data from a material regression sensor positioned along a fuel core of a vortex hybrid motor of the vortex hybrid motor system. At 504, the vortex hybrid motor system can determine, using the at least one processor and based on the sensed data, at least one characteristic of the fuel core. At 506, the vortex hybrid motor can control, based on the determined at least one characteristic, a flow rate of an oxidizer to a combustion zone within the vortex hybrid motor.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A vortex hybrid motor system, comprising:
   a material regression sensor positioned along a fuel core of a vortex hybrid motor of the vortex hybrid motor system, the material regression sensor configured to sense data associated with the fuel core;
   at least one processor communicatively coupled to the material regression sensor; and
   at least one memory storing instructions thereon that, when executed by the at least one processor, result in operations comprising:
      receiving, using the at least one processor, the sensed data from the material regression sensor;
      determining, using the at least one processor and based on the sensed data, at least one characteristic of the fuel core; and
      controlling, based on the determined at least one characteristic of the fuel core, a flow rate of an oxidizer to a combustion zone within the vortex hybrid motor;
      wherein the at least one characteristic includes a surface area of a surface of the fuel core.

2. The vortex hybrid motor system of claim 1, wherein the at least one characteristic further includes a burn rate of the fuel core.

3. The vortex hybrid motor system of claim 1, wherein the material regression sensor extends approximately perpendicular to the surface of the fuel core.

4. The vortex hybrid motor system of claim 1, wherein the surface defines at least a part of the combustion zone.

5. The vortex hybrid motor system of claim 1, wherein the material regression sensor includes a plurality of rungs that are electrically conductive and spaced apart along a conductive feature.

6. The vortex hybrid motor system of claim 5, wherein the determining is based on one or more of a distance between a pair of rungs of the plurality of rungs and a duration between a change in resistance detected from the sensed data.

7. The vortex hybrid motor system of claim 1, wherein the fuel core includes one or more of a rubber, plastic, wax, metal powder, carbon, and manufactured fuel.

8. The vortex hybrid motor system of claim 1, wherein the oxidizer includes one or more of a liquid oxygen, hydrogen peroxide, nitrous oxide, and nitric acid.

9. The vortex hybrid motor system of claim 1, wherein the controlling of the flow rate includes providing instructions to an oxidizer injector to increase or decrease the flow rate of oxidizer dispensed from the oxidizer injector, the oxidizer injector being in fluid communication with the combustion zone.

10. A method of a vortex hybrid motor system, the method comprising:
    receiving, using at least one processor of the vortex hybrid motor system, sensed data from a material regression sensor positioned along a fuel core of a vortex hybrid motor of the vortex hybrid motor system;
    determining, using the at least one processor and based on the sensed data, at least one characteristic of the fuel core; and
    controlling, based on the determined at least one characteristic, a flow rate of an oxidizer to a combustion zone within the vortex hybrid motor;
    wherein the at least one characteristic includes a surface area of a surface of the fuel core.

11. The method of claim 10, wherein the at least one characteristic further includes a burn rate of the fuel core.

12. The method of claim 10, wherein the material regression sensor extends approximately perpendicular to the surface of the fuel core.

13. The method of claim 10, wherein the surface defines at least a part of the combustion zone.

14. The method of claim 10, wherein the material regression sensor includes a plurality of rungs that are electrically conductive and spaced apart along a conductive feature.

15. The method of claim 14, wherein the determining is based on one or more of a distance between a pair of rungs of the plurality of rungs and a duration between a change in resistance detected from the sensed data.

16. The method of claim 10, wherein the fuel core includes one or more of a rubber, plastic, wax, metal powder, carbon, and manufactured fuel.

17. The method of claim 10, wherein the oxidizer includes one or more of a liquid oxygen, hydrogen peroxide, nitrous oxide, and nitric acid.

18. The method of claim 10, wherein the controlling of the flow rate includes providing instructions to an oxidizer injector to increase or decrease the flow rate of oxidizer dispensed from the oxidizer injector, the oxidizer injector being in fluid communication with the combustion zone.

19. The vortex hybrid motor system of claim 1, wherein the material regression sensor is a first material regression sensor positioned approximately perpendicular to a longitudinal axis of the fuel core, and wherein the vortex hybrid motor system further includes a second material regression sensor positioned along the fuel core approximately parallel to the longitudinal axis of the fuel core.

20. The method of claim 10, wherein the material regression sensor is a first material regression sensor positioned approximately perpendicular to a longitudinal axis of the fuel core, and wherein the vortex hybrid motor system further includes a second material regression sensor positioned along the fuel core approximately parallel to the longitudinal axis of the fuel core.

* * * * *